United States Patent [19]

Akeda et al.

[11] Patent Number: 4,472,666
[45] Date of Patent: Sep. 18, 1984

[54] BRUSHLESS DC MOTOR

[75] Inventors: Takafumi Akeda, Moriguchi; Makoto Gotou, Nishinomiya; Yoshiaki Igarashi, Ikoma; Yoshiteru Hosokawa, Hirakata, all of Japan

[73] Assignee: Matsushita Electric Industrial Co., Ltd., Osaka, Japan

[21] Appl. No.: 534,142

[22] Filed: Sep. 21, 1983

[30] Foreign Application Priority Data

Sep. 21, 1982 [JP] Japan ................................ 56-164368
Jan. 13, 1983 [JP] Japan .................................. 58-4955

[51] Int. Cl.³ .......................................... H02K 29/02
[52] U.S. Cl. .................................. 318/254; 318/138; 318/439
[58] Field of Search ................... 318/254 A, 254, 138, 318/439; 323/907

[56] References Cited

U.S. PATENT DOCUMENTS 3,896,357  7/1975  Tanikoshi ....................... 318/254 A
4,023,082  5/1977  Tanikoshi ....................... 318/254 A
4,039,911  8/1977  Tanikoshi ....................... 318/254 A
4,051,420  9/1977  Tanikoshi ....................... 318/254 A Primary Examiner—David Smith, Jr.
Attorney, Agent, or Firm—Wenderoth, Lind & Ponack

[57] ABSTRACT

A brushless DC motor, in which power supplied to polyphase stator coils is controlled by drive transistors, has a DC-DC switching converter for producing an output voltage according to an on-time ratio of the switching semiconductor, a voltage controller for detecting a voltage drops across the drive transistors and for controlling the on-time ratio of the switching semiconductor so that the voltage drops across the drive transistors become a predetermined small value, a temperature detector for detecting a temperature of the drive transistors, and a current reviser for reducing the output currents of the drive transistors in each activated period so that the currents of the drive transistors are controlled in response to a command signal and an output of the temperature detector.

5 Claims, 5 Drawing Figures

BRUSHLESS DC MOTOR

BACKGROUND OF THE INVENTION

1. Field of the Invention

This invention relates to a brushless DC motor in which current paths to polyphase coils are electronically switched by transistors.

2. Description of the Prior Art

The brushless DC motor, which does not use the brush-commutator contact has many advantages such as no occurrance of commutation noise, long life and high reliability, and has been widely used for the audio and visual equipments. In the brushless DC motor, the current paths are switched by a non-contact position detector and the drive transistors which is activated selectively in correspondence with the output signals of the position detector. The output currents of the drive transistors are controlled in such a way that the supply current to the polyphase coils becomes a predetermined value (the value corresponding to a command signal). As the result, the temperature of the drive transistors rises due to the power dissipation (collection loss) of the drive transistors, which causes the thermal breakdown or the decline of life of the drive transistors. In a case that the drive transistors and resistors are integrated on a single silicon chip, the power dissipation of the drive transistors causes the great increase of heat in the silicon chip, so that the integrated circuit (IC) is destroyed by the thermal breakdown. Especially, when the temperature of the environment where the motor is used is higher, the inner temperature becomes higher with respect to the same power dissipation. So the limitation against the environmental temperature for using the brushless DC motor is severe, which restricts the practical use of the brushless DC motor.

SUMMARY OF THE INVENTION

Accordingly, an object of the present invention is to provide a brushless DC motor having a protecting function which detects the temperature of the drive transistors and restricts the rise of the temperature of transistors so that the temperature of the drive transistors does not rise upto the temperature causing the thermal breakdown.

This object can be accomplished by a brushless DC motor comprising: a permanent magnet rotor having a plurality of N and S poles; polyphase stator coils provided in the magnetic field of the parmanent magnet rotor; a position detector for detecting the relative position of said permanent magnet rotor with respect to the polyphase stator coils; drive transistors for switching current paths from a DC voltage source to the polyphase stator coils; a distribution controller having a selector for activating the drive transistors selectively in correspondence with the output of the position detector, a current detector for detecting a supply current supplied to the polyphase stator coils, and a current controller for controlling output currents of the drive transistors in each activating period so that the supply current supplied to the polyphase stator coils changes in correspondence with a command signal; a temperature detector for detecting temperature of the drive transistors; and a current reviser for revising the output current of the temperature detector when the detected temperature is over a predetermined value.

The above and other objects, features and advantages will be apparent from consideration of the following description taken in connection with the accompanying drawings.

DESCRIPTION OF THE PREFERRED EMBODIMENTS

Figure 1:
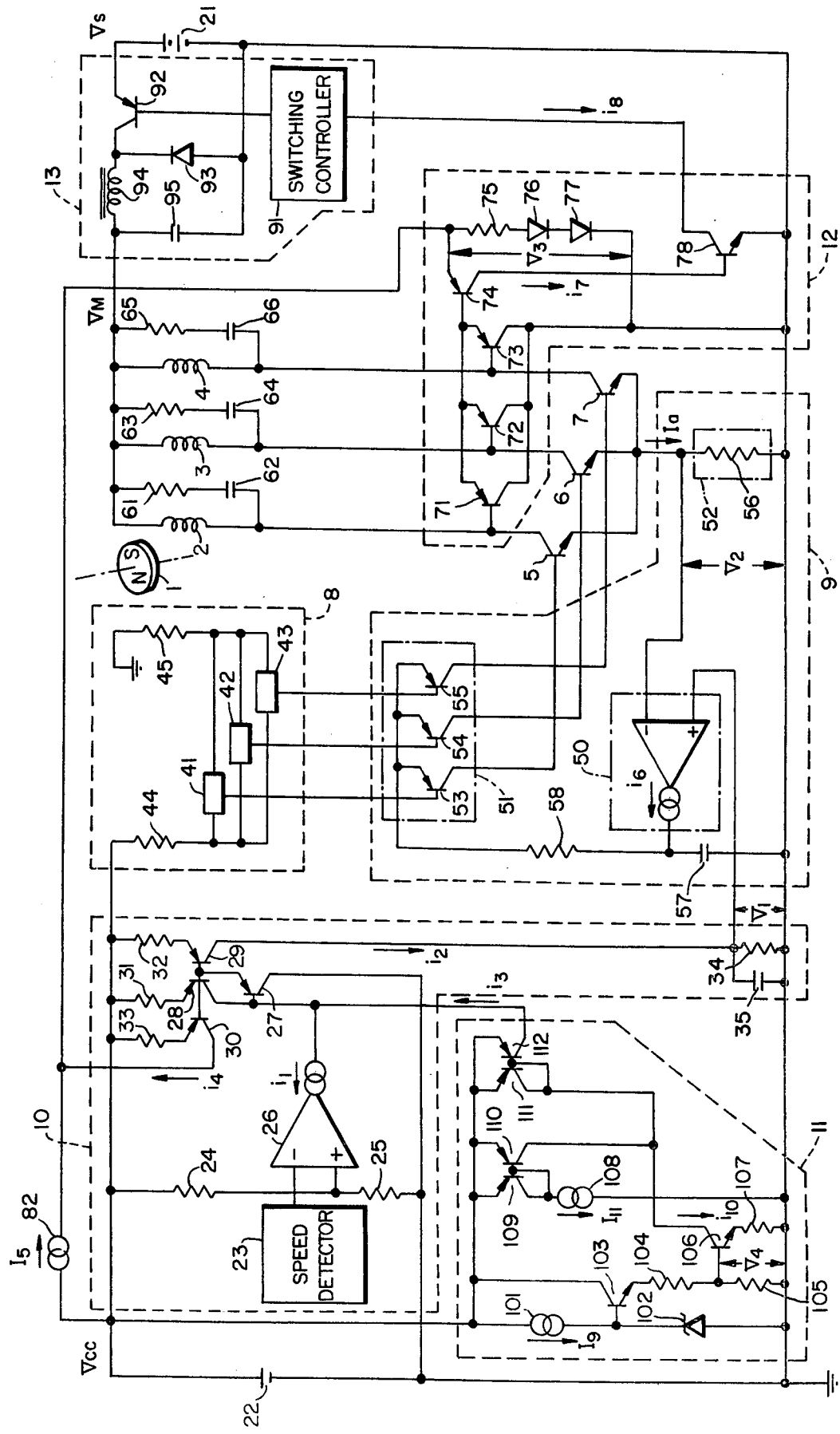
FIG. 1 is a circuit diagram of an embodiment of a brushless DC motor according to the present invention.

FIG. 1 shows a circuit diagram of an embodiment of a brushless DC motor according to the present invention. Referring to FIG. 1, reference numeral 1 is a permanent magnet rotor having a plurality of N and S poles, 2, 3 and 4 are three-phase stator coils provided in the magnetic field of the permanent magnet rotor 1. 5, 6 and 7 are drive transistors for switching current paths from a DC voltage sorce to the three-phase stator coils 2, 3 and 4, 8 in a position detector having Hall elements 41, 42 and 43 for detecting the relative position between the permanent magnet rotor 1 and the three-phase stator coils 2, 3 and 4. 9 is a distribution controller having a selector 51 for activating drive transistors 5, 6 and 7 selectively in accordance with the outputs of the position detector 8, a current detector 52 for detecting a supply current $I_a$ to the three-phase stator coils 2, 3 and 4, and a current controller 50 for controlling output currents $I_a$ of the drive transistors 5, 6 and 7 in each activated period so that the current applied to the three-phase stator coils 2, 3 and 4 corresponds to a command signal $V_1$. 11 is a temperature detector for detecting temperature of the drive transistors 5, 6 and 7 (or temperature of the chip), 12 is an operating voltage detector for detecting at least one of the voltage drops across drive transistors 5, 6 and 7 in each activated period, comparing the detected signal with a predetermined value and producing an output signal which controls the output voltage of a DC-DC switching converter 13 for producing another voltage from a voltage of a DC voltage source 21. A voltage controller, which make the voltage drops across the drive transistors 5, 6 and 7 in each activated period into a predetermined value $V_3$, controls the output voltage of the DC-DC switching converter 13 in response to the output of the operating voltage detector 12.

Next, the operation of the brushless DC motor shown in FIG. 1 according to the present invention will be described.

A speed detector 23 of the command signal generator 10 comprises a frequency generator (not shown) and a period to voltage converter (not shown), for example. The output signal of the speed detector 23 is low level when the rotational speed of the motor is low and high level when the rotational speed of the motor is higher than a predetermined speed. The current converter 26 compares the level of the output signal of the speed detector 23 with a predetermined voltage determined by resistors 24 and 25, and changes an output current $i_1$ (absorbing current) in response to a differential voltage between the output of the speed detector 23 and the predetermined voltage. The current converter 26 comprises a differential voltage amplifier (not shown) and a voltage to current converter (not shown), for example.

The output terminal of the current converter 26 is connected to the output terminal of the termperature detector 11. And a differential current $(i_1-i_3)$ of the both output currents of the current converter 26 and the temperature detector 11 is applied to a current mirror circuit comprising transistors 27, 28, 29 and 30 and resistors 31, 32 and 33. The output currents $i_2$ and $i_4$ of the current mirror circuit are proportional to the differential current $(i_1-i_3)$. If the resistance value of each of the resistors 31, 32 and 33 is the same, each of the output currents $i_2$ and $i_4$ is equal to the differential current $(i_1-i_3)$.

The output current $i_2$ is converted to the command signal $V_1$ by a resistor 34 and a capacitor 35. The converting equation is $$V_1 = \frac{R_{34}}{1 + j\omega C_{35} R_{34}} \cdot i_2 \qquad (1)$$

which has a low-pass filter characteristic, where $R_{34}$ is the resistance of the resistor 34 and $C_{35}$ is the capacitance of the capacitor 35.

A current controller 50 of a distribution controller 9 is applied with the command signal $V_1$ at a positive input terminal and the output $V_2$ of the current detector 52 at a negative input terminal, and outputs a current $i_6$ in response to the differential voltage $(V_1-V_2)$ of the both input terminals. The current controller 50 comprising, for example, a differential voltage amplifier and a voltage to current converter, supplys an output current $i_6$ to a common emitter terminal of the selector 51. The output voltages of Hall elements 41, 42 and 43 of a position detector 8 are applied to the base terminals of transistors 53, 54 and 55 in the selector 51. The Hall elements 41, 42 and 43 detect magnetic flux of the permanent magnet rotor having a plurality of N and S poles, and generate three-phase alternating voltages according to the relative rotational position of the permanent magnet rotor to the three-phase stator coils.

The transistors 53, 54 and 55 of the selector 51 distribute the common emitter current to each of the collector terminals. The collector current of the transistor having the lowest base voltage is the maximum and the collector currents of the other transistors are almost zero. The collector currents of transistors 53, 54 and 55 of the selector 51 become the base currents of drive transistors 5, 6 and 7, respectively. The current $I_a$, which is amplified by the drive transistors 5, 6 and 7, is supplied to the three-phase coils 2, 3 and 4. The current $I_a$ supplied to the three-phase coils 2, 3 and 4 is detected as a voltage drop $V_2$ of a resistor 56 of the current detector 52. The voltage drop $V_2$ is applied to the negative input terminal of the current controller 50.

So, a first feedback loop comprising the current controller 50, the selector 51, the drive transistors 5, 6 and 7 and the current detector 52, controls the supply current $I_a$ supplied to the three-phase stator coils 2, 3 and 4 according to the command signal $V_1$. (Actually, this first feedback loop operates in such a manner that the voltage drop $V_2$ across the resistor 56 becomes equal to the command signal $V_1$).

The operation of the first feedback loop will be more detailedly described. The increase of the command signal $V_1$ causes in turn the increases of the output current $i_6$ of the current controller 50, the base currents and the output currents of the drive transistors 5-7 selected by the selector 51, and the voltage drop $V_2$ of the resistor 56. The voltage drop $V_2$ becomes stable when it becomes equal to the command signal $V_1$.

Therefore, the supply current $I_a$ supplied to the three-phase stator coils 2, 3 and 4 is given by the following equation (2):

$$I_a = \frac{V_1}{R_{56}} \qquad (2)$$

where $R_{56}$ is the resistance value of the resistor 56. Accordingly, the first feedback loop (comprising the current controller 50, the selector 51, the drive transistors 5-7 and the current detector 52) remarkably reduces the variation of the supply current $I_a$ due to the hfe variation among the drive transistors 5, 6 and 7.

The output voltages of the Hall elements 41, 42 and 43 vary according to the rotation of the permanent magnet rotor 1, and control the drive transistors 5, 6 and 7 so as to supply the current $I_a$ to the three-phase stator coils 2, 3 and 4 in accordance with the relative position of the rotor 1 with respect to the stator coils 2-4. A capacitor 57 is provided for phase compensation (oscillation-protection) of the first feedback loop. Three RC series circuits (comprising resistors 61, 63, 65 and capacitors 62, 64, 66 respectively) which are connected parallel with the three-phase stator coils 2, 3 and 4 are provided for reducing spike voltage which is generated by switching the supply current paths.

Next, the operation of the operating voltage detector 12 (the voltage controller) and the DC-DC switching converter 13 in FIG. 1 will be described. The DC-DC switching converter 13 comprises a switching transistor 92, an inductor 94, a flywheel diode 93, a capacitor 95 and a switching controller 91. The switching transistor 92 is inserted into a path for supply electrical power from a DC voltage source 21 ($V_s=20$ V) to a common connected terminal of the three-phase stator coils 2-4.

The switching controller 91, which can be constructed by the known manner by using sawtooth-wave generator and a comparator, produces a pulse train with a pulse width (duty) corresponding to the input current $i_8$. The switching controller 91 controls the on-time ratio (substantially, the duty ratio) of the switching transistor 92 according to the input current $i_8$, and changes the output voltage $V_M$ of the DC-DC switching converter 13. The output voltage $V_M$ of DC-DC switching converter is applied to the three-phase stator coils 2-4 and the drive transistors 5-7, which are activated sequentially according to the operation of the distribution controller 9.

The operation voltage detector 12 detects the voltage drops across the drive transistors 5-7 in each activated period. A collector current $i_4$ of the transistor 30 in the command signal generator 10 ($i_4 \propto i_1-i_3$) and a constant current $I_5$ of a constant current source 82 are added and supplied to a resistor 75 and diodes 76, 77, thereby to obtain a predetermined voltage $V_3$ (when a comparing transistor 74 turns off) expressed as follows:

$$V_3 = R_{75} \cdot (i_4 + I_5) + 2V_D \qquad (3)$$

where $R_{75}$ is the resistance value of the resistor 75, $V_D$ the forward voltage drop across each of the diodes 76 and 77.

Base terminals of the detecting transistors 71, 72 and 73 are connected with output terminal (collector terminals) of the drive transistors 5, 6 and 7, respectively directly or through resistors and diodes. Emitter terminals (connected in common) of the detecting transistors 71, 72 and 73 are connected with the base terminal of a comparing transistor 74. Collector terminals (connected in common) of the detecting transistors 71, 72 and 73 are connected with the lowest electric potential point (earth potential point). Accordingly, the voltage of the common connected emitter of the detecting transistors 71–73 is the voltage in correspondence with the voltage drop across each of the drive transistors 5–7 in each activated period. The comparing transistor 74 outputs a collector current $i_7$ in response to the detected voltage. The current $i_7$ is amplified by a transistor 78 to become an output current $i_8$ of the transistor 78, the current $i_8$ being absorbed from the switching controller 91 of the DC-DC switching converter 13.

Here, providing that $V_{CE}$ is the voltage drop across the drive transistors 5–7 in each activated period, $V_{BE}$ the forward voltage drop between base and emitter of each of detecting transistors 71–73 corresponding to the drive transistors 5–7 and the comparing transistor 74, the predetermined voltage $V_3$ is given by the following equation (4) and (5):

$$V_3 = V_{CE} + 2V_{BE} + R_{56}I_a \quad (4)$$

$$V_3 = R_{75}(i_4 + I_5 - i_7) + 2V_D \quad (5)$$

The collector current $i_7$ is given by the following equation (6), providing that $V_{BE}$ is equal to $V_D$:

$$i_7 = \frac{1}{R_{75}} \{R_{75} \cdot (i_4 + I_5) - R_{56}I_a - V_{CE}\} \quad (6)$$

Therefore, the collecter current $i_7$ of the comparing transistor 74 changes in response to the differential voltage between the voltage drop $V_{CE}$ across the drive transistors 5–7 in each activated period and the predetermined voltage $\{R_{75}(i_4 + I_5) - R_{56}I_a\}$, and accordingly the output current $i_8$ of the operating voltage detector 12 changes.

The output current $i_4$ of the current mirror circuit and the output current $I_a$ of the drive transistors 5–7 change in response to the output voltage of the speed detector 23 (actually, in response to $(i_1 - i_3)$). The resistance values of all resistors are decided so as to satisfy the following inequation (7):

$$R_{75} \cdot i_4 \geq R_{56} \cdot I_a \quad (7)$$

Therefore, a second feedback loop comprising the operating voltage detector 12 (the voltage controller), the DC-DC switching converter 13 and the three-phase stator coils 2–4 detects the voltage drop across the drive transistors 5, 6 and 7 in each activated period and the voltage drop is allowed to be exactly equal or approximately equal to a predetermined value in the normal operating region. (In general, the normal operating region is the region where the transistor can control its voltage drop continuously with a fixed input voltage according to the control signal at the control terminal.)

In other words, when the voltage drop across the drive transisters 5, 6 and 7 in each activated period decreases, the collector current $i_7$ of the comparing transistor 74 increases and also the output current $i_8$ of the operating voltage detector 12 increases. Th increase of the collector current $i_7$ of the comparing transister 74 changes the pulse width of the output pulses of the switching controller 91 of the DC-DC switching converter 13 so as to increase the on-time ratio of the switching transistor 92, thereby increasing the output voltage $V_M$ of the DC-DC switching converter 13. As the result, the voltage drop across the drive transistors 5, 6 and 7 in each activated period increases.

As described above, the collector losses (power dissipation) of the drive transistors 5–7 can be remarkably reduced, because the voltage drops across the drive transistors 5–7 are a predetermined small value in the normal operating region. Especially, it is more-effective when the supply current $I_a$ to the coils 2–4 is small. Also, the power loss due to the voltage converting operation of the DC-DC switching converter 13 is extremely small, because the DC-DC switching converter 13 changes the predetermined output voltage $V_M$ by controlling the on-time ratio of the switching transistor 92. Thus, the brushless DC motor in FIG. 1 has remarkably improved power efficiency, in case of the low supply current. Especially, when $(R_{75} \cdot i_4 - R_{56} \cdot I_a)$ is greater than zero, the voltage drop across the drive transistors 5, 6 and 7 in each activated period can be equal to the predetermined value in case of the high supply current and the predetermined small value in the normal operating region in case of the low supply current.

Next, the operation of the temperature detector 11 in FIG. 1 will be described.

When the temperature of the drive transistors 5–7 rises up, for example, when the motor is started under high temperature (about 80° C.), or the motor-lock is caused by an overload or by a trouble, the output current $i_3$ of the temperature detector 11 becomes positive (the output current $i_3$ is zero at a normal temperature or a low temperature). A predetermined standard voltage $V_4$ having a low temperature drift is produced by the circuit comprising a constant current source 101, a Zener diode 102, a transistor 103 and resistors 104 and 105, and applied to the base terminal of transistor 106 for detecting temperature. The emitter terminal of the transistor 106 is connected with the other terminal of the predetermined standard voltage $V_4$ through a resistor 107 having a small resistance value (about 100Ω). The collector terminal of the transistor 106 is connected with a constant current source 108, a current supply circuit comprising transistors 109 and 110, and a current mirror circuit comprising transistors 111 and 112, so that the output current $i_3$ of the transistor 112 is supplied to the output terminal of the current converter 26. The transistor 106 is disposed at a position very close to at least one of the drive transistors 5, 6 and 7 (thermal coupling) and detects the temperature of the drive transistors 5, 6 and 7. Actually, the drive transistors 5, 6 and 7 and the transistor 106 for detecting temperature are integrated on a single silicon chip as an integrated circuit.

Figure 2:
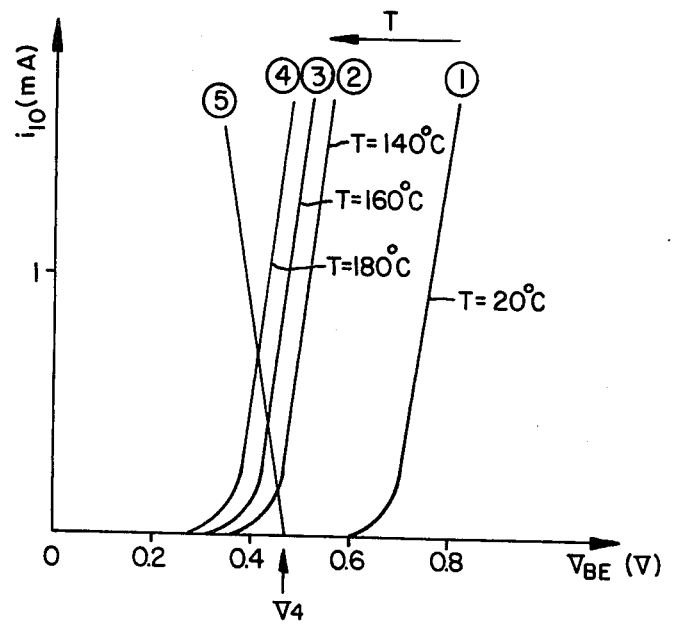
FIGS. 2 to 4 are characteristic curves for explaining the operation of the temperature detector shown in FIG. 1.

Now, when the temperature of the drive transistors 5–7 rises, the relation between a collector current $i_{10}$ and a forward voltage drops $V_{BE}$ between the base and emitter of the transistors 106 changes as the curves shown by ① to ④ in FIG. 2. On the other hand, the predetermined standard voltage $V_4$ is given by equation (8), below where $R_{107}$ is the resistance value of the resistor 107.

$$V_4 = V_{BE(T)} + R_{107} \cdot i_{10} \quad (8)$$

So, the collector current $i_{10}$ of the transistor 106 is given as an intersection of $V_{BE}$ versus $i_{10}$ characteristic curve determined by the temperature T and a straight line $(i_{10}=(V_4-V_{BE})/R_{107})$ shown in FIG. 2. Thus, the collector current $i_{10}$ of the transistor 106 changes according to the change of the temperature T.

Figure 3:
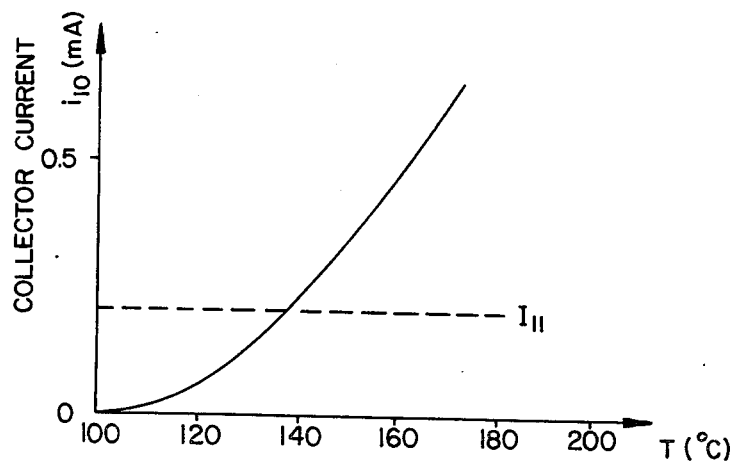
Figure 4:
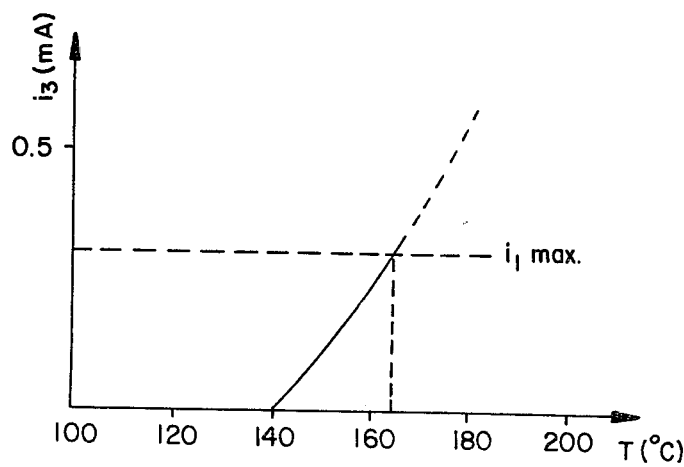

FIG. 3 shows the relation of the collector current $i_{10}$ versus the temperature T. The collector current $i_{10}$ of the transistor 106 is small when the temperature T is low (under 100° C.), and it slowly increases in response to the rise of the temperature T. When the collector current $i_{10}$ of the transistor 106 is less than a constant current $I_{11}$ of the constant current source 108, the output current $i_3$ of the temperature detector 11 is zero, so as not to affect on the motor rotation. When the temperature T rises and the collector current $i_{10}$ of the transistor 106 becomes greater than the constant current $I_{11}$ of the constant current source 108, the output current $i_3$ of the temperature detector 11 becomes $(i_{10}-I_{11})$ (shown in FIG. 4).

The output current $i_3$ of the temperature detector 11 is supplied to the output terminal of the current converter 26 and reduces the output currents $i_2$ and $i_4$ of the current mirror circuit which comprises transistors 27, 28, 29 and 30 and resistors 31, 32 and 33 ($i_2=i_4=i_1-i_3$). The reduction of the output current $i_2$ of the current mirror circuit reduces the command signal $V_1$, the supply current $I_a$ to the three-phase stator coils 2-4, and the output current of the drive transistors by the operation of the first feedback loop. The reduction of the output current $i_4$ of the current mirror circuit reduces the predetermined voltage $V_3$ and the voltage drops $V_{CE}$ across the drive transistors 5-7 in each activated period by the second feedback loop. As a result, the rise of the temperature is limited, because the power dissipation (collector loss) of the drive transistors 5 to 7 reduces.

That is, a third feedback loop (a temperature limiting loop) is constructed by the temperature detector 11, a current reviser for reducing the output current $I_a$ of the drive transistors 5-7 in response to the output current $i_3$ of the temperature detector 11 (here, the current reviser comprises a part of the command signal generator 10 and the first feedback loop), a voltage reviser for reducing the voltage drops $V_{CE}$ across the drive transistors 5-7 in each activated period in response to the output current $i_3$ of the temperature detector 11 (here, the voltage reviser comprises a part of the command signal generator 10 and the second feedback loop) and the drive transistors 5-7, and limits the excessive rise of the temperature by controlling the power dissipation (collector loss $P_C=V_{CE}\cdot I_a$) of the drive transistors 5-7. Accordingly, even if the temperature of the environment where the motor is used is high, the thermal breakdown of the drive transistors 5-7 can be avoided.

The third feedback loop operates only for limiting the rise of the temperature of the drive transistors 5-7, and even when the third feedback loop is operating (the temperature is over 140° C.) the supply current $I_a$ is supplied to the three-phase stator coils 2-4. Accordingly, even if the surrounding temperature is high and the motor drives a relatively heavy load, the accelerating torque is obtained by the permanent magnet rotor 1 and the supply current $I_a$ of the three-phase coils 2-4, so that the motor is accurately started and accelerated to be the speed-controlled state.

The embodiment of the brushless DC motor circuit as shown in FIG. 1 is suitable to an integrated circuit. Transistors, diodes and resistors of the drive transistors 5, 6 and 7, the distribution controller 9, the command signal generator 10, the temperature detector 11, the operating voltage detector 12, the DC-DC switching converter 13 can be integrated on a single silicon chip. Especially, the transistor 106 for detecting temperature and the drive transistors 5, 6 and 7 are preferable to be formed in a integrated circuit.

Further, in the embodiment as shown in FIG. 1, the voltage drops $V_{CE}$ across the drive transistors 5, 6 and 7 in each activated period is controled to be a predetermined small value in the normal operating region. Accordingly, the power dissipation (collector loss $P_C=V_{CE}\cdot I_a$) of the drive transistors 5, 6 and 7 decreases and the rise of the temperature is limited. Also, the relation of the power dissipation of the drive transistors 5, 6 and 7 versus the change of the supply current $I_a$ (or the command signal $V_1$) is linear (proportional) or approximately linear, so the third feedback loop can be constructed by linear circuit elements, which assures stable operation.

In the embodiment of the brushless DC motor shown in FIG. 1, the output voltage $V_M$ of the DC-DC switching converter 13 is so controlled that the drive transistors 5, 6 and 7 operate actively in the normal operating region and the predetermined current is supplied to the three-phase stator coils 2, 3 and 4 by controlling the output current $I_a$ of the drive transistors 5, 6 and 7. However, the brushless DC motor according to the present invention is not limited to the embodiment as shown in FIG. 1, but can be applicable to such a case that the drive transistors 5, 6 and 7 execute turning-on-and-off (saturation and cut-off) operations.

Figure 5:
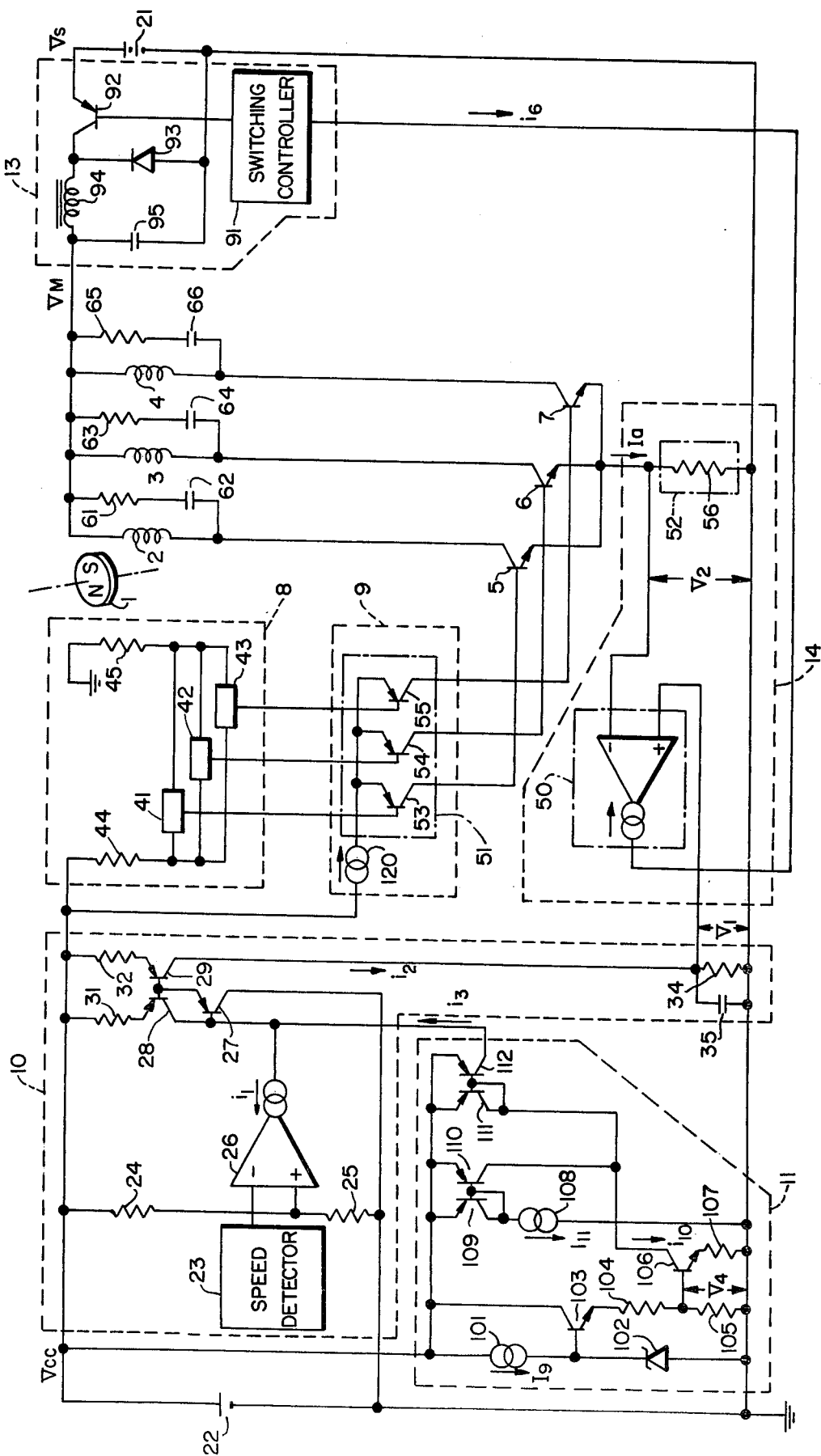
FIG. 5 is a circuit diagram of another embodiment of a brushless DC motor according to the present invention.

FIG. 5 shows such as embodiment of the brushless DC motor according to the present invention. In FIG. 5, same elements as FIG. 1 are indicated by same reference numeral as those used in FIG. 1, and explanation for the same elements will be omitted.

Referring to FIG. 5, the distribution controller 9 comprising a constant current source 120 and the selector 51 turns on and off the drive transistors 5, 6 and 7 by distributing the current of the constant current source 120 to the base terminals of the drive transistors 5, 6 and 7 in correspondence with the outputs of the position detector 8, and supply the current $I_a$ to the three-phase stator coils 2, 3 and 4 according to the relative position of the permanent magnet rotor with respect to the three-phase stator coils 2, 3 and 4.

The supply current $I_a$ to the three-phase coils 2, 3 and 4 is detected by the current detector 52 of a voltage controller 14, which produces the voltage $V_2$ in response to the supply current $I_a$. The comparator 50 compares the detecting voltage $V_2$ with the command signal $V_1$, and absorbs the current $i_6$ in response to the differential voltage between $V_1$ and $V_2$ from the switching controller 91 of the DC-DC switching controller 13. Therefore, the output voltage $V_M$ of the DC-DC switching converter 13 is the voltage in response to the output current $i_6$ of the voltage controller 14. A feedback loop, comprising the current detector 52 of the voltage controller 14, the comparator 50, the DC-DC switching converter 13 and the three-phase stator coils 2, 3 and 4, remarkably reduces the influence of the variation of the saturation voltage among the drive transistors 5, 6 and 7. So, the supply current $I_a$ of the three-phase stator coils 2, 3 and 4 becomes the value exactly in correspondence with the command signal $V_1$.

When the temperature of the drive transistors 5, 6 and 7 is over a predetermined value due to the power dissipation (collector loss according to the saturation voltage $V_{CE(sat)}$ and the supply current $I_a$) of the drive transistors 5, 6 and 7, the temperature detector 11 operates so as to increase the output current i₃ of the temperature detector 11. The increase of the output current i₃ of the temperature detector 11 reduces the command signal V₁, and reduces the supply current $I_a$ to the three-phase stator coils 2, 3 and 4 by the action of the abovesaid feedback loop. As the result, the power dissipation of the drive transistors 5, 6 and 7 in each activated period decreases, so that the rise of the temperature is limited. That is, the feedback loop, comprising the temperature detector 11, a current reviser in response to the output of the temperature detector 11 (here, the current reviser comprises a part of the command signal generator and the abovesaid feedback loop) and the drive transistors 5, 6 and 7, prevent the drive transistors 5, 6 and 7 from rising their temperature excessively.

As apparant from the foregoing description, the present invention is not limited to a rotary brushless DC motor but can be applicable to the so-called linear brushless DC motor, and is not limited to a motor having the three-phase stator coils but can be applicable to a motor having polyphase coils in general. Further, the position detector can be realized by various means which are well-known. Also, any types of transistors such as bipolar transistors and field effect transistors, can be used as the drive transistors 5, 6 and 7 and the switching transistor 92.

Further, the output voltage $V_M$ of the DC-DC switching converter 13 is lower than the DC voltage source 21 in the above-described embodiments. However, the present invention is not limited such a case as the above-described embodiments. For example, the DC-DC switching converter can be also a voltage booster which produces a higher voltage than a DC voltage source such as a battery. An inverter control DC-DC switching converter or a chopper control DC-DC switching converter can also be used in the embodiments as shown in FIG. 1 and FIG. 5.

Various modifications of the construction of the brushless DC motor according to the present invention are possible within the scope of the present invention.

What is claimed is:

1. A brushless DC motor comprising:
   a permanent magnet rotor having a plurality of N and S poles;
   polyphase stator coils provided in the magnetic field of said permanent magnet rotor so as to generate polyphase alternating voltages according to the relative rotation of said permanent magnet rotor with respect to said polyphase stator coils;
   a position detector for detecting a relative position of said permanent magnet rotor with respect to said polyphase stator cois;
   drive transistors for switching current paths from a DC voltage source to said polyphase stator coils;
   a distribution controller having a selector for activating said drive transistors selectively in correspondence with the output of said position detector, a current detector for detecting a supply current to said polyphase stator coils, and a current controller for controlling output currents of said drive transistors in each activated period so that the supply current to said polyphase stator coils changes corresponding to a command signal;
   a temperature detector for detecting temperature of said drive transistors; and
   a current reviser for revising the output currents of said drive transistors in response to the output of said temperature detector when the detected temperature is over a predetermined value.

2. A brushless DC motor according to claim 1, wherein said temperature detector comprises transistors, diodes and resistors, and said temperature detector and said drive tranistors are fabricated on a single silicon chip.

3. A brushless DC motor comprising:
   a permanent magnet rotor having a plurality of N and S poles;
   polyphase stator coils provided in the magnetic field of said permanent magnet rotor so as to generate polyphase alternating voltages according to the relative rotation of said permanent magnet rotor with respect to said polyphase stator coils;
   a position detector for detecting a relative position of said permanent magnet rotor with respect to said polyphase stator coils;
   a DC-DC switching converter for producing another voltage from a voltage of a DC voltage source, and provided in the path from said DC voltage source to said polyphase stator coils;
   drive transistors for switching current paths from said DC voltage source to said polyphase stator coils;
   a distribution controller having a selector for activating said drive transistors selectively in correspondence with the output of said position detector, a current detector for detecting a supply current to said polyphase stator coils, and a current controller for controlling output currents of said drive transistors in each activated period so that the supply current to said polyphase stator coils changes corresponding to a command signal;
   a voltage controller having an operating voltage detector for detecting at least one of the voltage drops across said drive transistors in each activated period, for comparing the detected signal with a predetermined value and for producing an output signal which controls the output voltage of said DC-DC switching converter in response to the output of said operating voltage detector;
   a temperature detector for detecting temperature of said drive transistors; and
   a current reviser for revising the output currents of said drive transistors in response to the output of said temperature detector when the detected temperature is over a predetermined value.

4. A brushless DC motor according to claim 3, wherein the predetermined voltage of said comparator is also revised in response to the output of the current reviser.

5. A brushless DC motor comprising:
   a permanent magnet rotor having a plurality of N and S poles;
   polyphase stator coils provided in the magnetic field of said permanent magnet rotor so as to generate polyphase alternating voltages according to the relative rotation of said permanent magnet rotor with respect to said polyphase stator coils;
   a position detector for detecting a relative position of said permanent magnet rotor with respect to said polyphase stator coils;
   a DC-DC switching converter for producing another voltage from a voltage of a DC voltage source, and provided in the path from said DC voltage source to said polyphase stator coils;

drive transistors for switching current paths from said DC voltage source to said polyphase stator coils;

a distribution controller for activating said drive transistors selectively in correspondence with the output of said position detector;

a voltage controller having a current detector for detecting a supply current to said polyphase stator coils, a comparator for comparing a command signal with the output signal of said current detector and for controlling output voltage of said DC-DC switching converter so that a voltage applied to said polyphase stator coils changes corresponding to a command signal;

a temperature detector for detecting temperature of said drive transistors; and a current reviser for revising the output currents to said drive transistors in response to the output of said temperature detector when the detected temperature is over a predetermined value.

* * * * *